United States Patent
Ono

(10) Patent No.: US 8,830,510 B2
(45) Date of Patent: Sep. 9, 2014

(54) TRANSMISSION APPARATUS, RECEPTION APPARATUS, SERIAL COMMUNICATION APPARATUS, AND PRINTING APPARATUS INCLUDING THE SERIAL COMMUNICATION APPARATUS

(75) Inventor: Takashi Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/483,853

(22) Filed: May 30, 2012

(65) Prior Publication Data

US 2012/0314252 A1 Dec. 13, 2012

(30) Foreign Application Priority Data

Jun. 7, 2011 (JP) ................... 2011-127651

(51) Int. Cl.
*G06F 3/12* (2006.01)
*G06K 15/00* (2006.01)

(52) U.S. Cl.
USPC .................. 358/1.15; 358/1.16; 358/1.17

(58) Field of Classification Search
CPC .......... H04L 2007/045; H04L 7/033
USPC ................. 358/1.1–1.9, 1.11–1.18
See application file for complete search history.

(56) References Cited

U.S. PATENT DOCUMENTS

| 4,641,133 A | 2/1987 | Ono |
| 4,719,514 A | 1/1988 | Kurahayashi et al. |
| 4,897,831 A | 1/1990 | Negi et al. |
| 5,075,783 A | 12/1991 | Yoshida et al. |
| 5,216,705 A | 6/1993 | Yoshida et al. |
| 5,394,406 A | 2/1995 | Ono et al. |
| 5,630,032 A * | 5/1997 | Yamaguchi et al. ......... 358/1.16 |
| 7,907,295 B2 | 3/2011 | Ono |
| 2009/0174898 A1 | 7/2009 | Ono |

FOREIGN PATENT DOCUMENTS

JP 2007-336190 A 12/2007

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

The invention has been made to solve a problem that as the cycle of a transmission clock fluctuates with respect to the cycle of a sampling clock for one bit on the reception side, a reception error occurs. To deal with this, every time sampling data is inverted in a reception data string, the sampling clock is re-synchronized. Furthermore, if there are a predetermined number of successive identical data, an inverted dummy bit is inserted for re-synchronization.

4 Claims, 15 Drawing Sheets

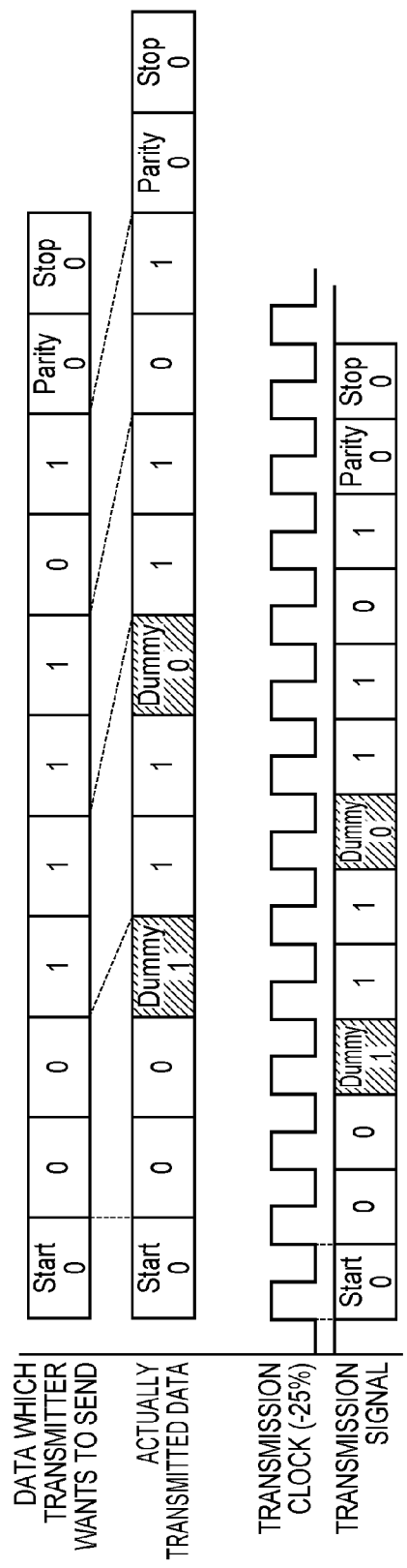
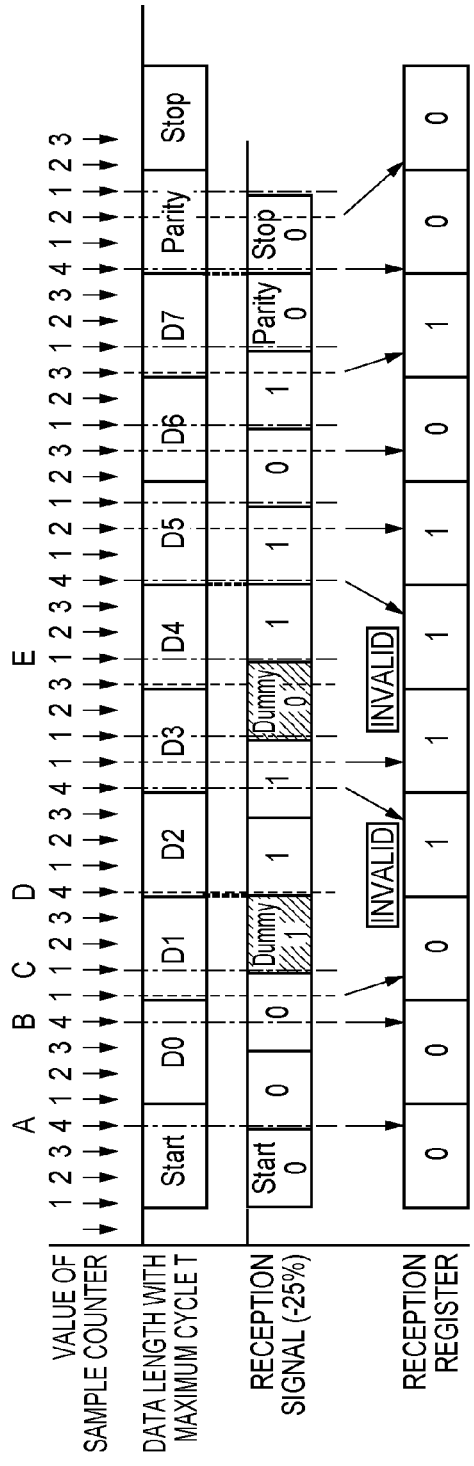

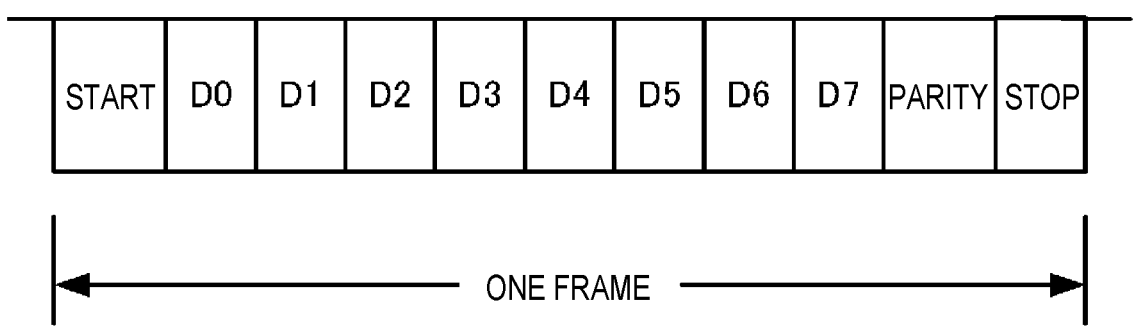
F I G. 15

TRANSMISSION APPARATUS, RECEPTION APPARATUS, SERIAL COMMUNICATION APPARATUS, AND PRINTING APPARATUS INCLUDING THE SERIAL COMMUNICATION APPARATUS

BACKGROUND OF THE INVENTION

1. Field of the Invention

The present invention relates to a transmission apparatus using asynchronous serial communication, a reception apparatus using asynchronous serial communication, a serial communication apparatus using asynchronous serial communication, and a printing apparatus including the serial communication apparatus.

2. Description of the Related Art

Conventionally, in serial communication which adopts an asynchronous communication method, there is a frequency deviation between a transmission clock on the transmission side and a reception clock on the reception side. Using, for example, a method described in Japanese Patent Laid-Open No. 2007-336190, therefore, reception of data is made more reliable, and synchronization correction for communication is performed.

In the conventional example described above, however, reception data is sampled with a sampling clock with a frequency higher than that of a communication clock, and it is determined based on the sampling result for one bit that data including a larger number of components "0" or "1" is determined as reception data. In principle, therefore, an error due to a frequency deviation is accumulated in subsequent bits. That is, a sampling result includes more errors towards the subsequent bits.

Assume that a communication unit (for example, a unit of a start bit/data/parity bit/stop bit) is defined as one frame. In this case, when an error with a ½ bit or more is accumulated while one frame is received, the frame cannot be correctly received.

FIG. 15 is a view showing the structure of one frame in asynchronous serial communication.

Since one frame is defined by a start bit (one bit), data (eight bits), a parity bit (one bit), and a stop bit (one bit) as shown in FIG. 15, it can only be correctly received up to a deviation of ±5%. Furthermore, if the number of bits of data in one frame increases, a tolerable deviation becomes smaller, as a matter of course.

As countermeasures against EMI (electromagnetic noise), there is conventionally proposed that an attempt is made to reduce radiation noise generated by a transmission signal by fluctuating a transmission clock using an SSCG (Spectrum Spread Clock Generator) technique. Even in this case, however, it is impossible to achieve sufficient noise reduction since a clock cannot fluctuate so much because of the tolerable deviation.

SUMMARY OF THE INVENTION

Accordingly, the present invention is conceived as a response to the above-described disadvantages of the conventional art.

For example, a transmission and reception apparatuses, a communication apparatus, and a printing apparatus using the communication apparatus according to this invention is capable of dealing with a large frequency deviation between transmission and reception clocks without limitation on the number of data bits in one frame.

According to one aspect of the present invention, there is provided a reception apparatus for receiving data using asynchronous serial communication, comprising: a reception unit configured to receive the data in a predetermined cycle; a memory unit; a reception counter which is updated when the reception unit receives the same data as that received one cycle before; a memory control unit configured to control storage into the memory such that when a value of the reception counter reaches a first value, the data received by the reception unit is stored into the memory, and when the data received by the reception unit is different from the data received one cycle before, the data received one cycle before is stored in the memory; and a setting unit configured to, when the data received by the reception unit is different from the data received one cycle before, set a second value different from the first value in the reception counter.

According to another aspect of the present invention, there is provided a reception apparatus for receiving data using asynchronous serial communication, comprising: a reception configured to receive one bit of the data in a predetermined cycle; a memory unit; a reception counter which is updated when the 1-bit data received by the reception unit has the same value as that of 1-bit data received one cycle before; a memory control unit configured to control storage into the memory such that when a value of the reception counter reaches a first value, the 1-bit data received by the reception unit is stored into the memory, and when the 1-bit data received by the reception unit is different from the data received one cycle before, the 1-bit data received one cycle before is stored into the memory; and a storage counter which is updated when 1-bit data having the same value is stored into the memory, wherein when a value of the storage counter reaches a third value, the memory control unit further controls storage into the memory not to store the data into the memory.

According to still another aspect of the present invention, there is provided a transmission apparatus for transmitting data to the above reception apparatus, using asynchronous serial communication, comprising: a generation unit configured to generate data; an addition unit configured to increment, when 1-bit data of the data generated by the generation unit is the same as preceding 1-bit data, a bit count, and add, when the incremented bit count meets a predetermined condition, inverted data as dummy bit data; and a transmission unit configured to transmit the data generated by the generation unit or the dummy bit data added by the addition unit in a second predetermined cycle, wherein a maximum cycle (T) of the second predetermined cycle and the predetermined cycle (SCLK) satisfy SCLK=T/n (n is a natural number not less than 3), and the predetermined condition is that the bit count (m) as a condition for adding the dummy bit data meets m≤n−1.

According to still another aspect of the present invention, there is provided a serial communication apparatus including the above transmission apparatus and the above reception apparatus.

According to still another aspect of the present invention, there is provided a printing apparatus including the above serial communication apparatus wherein a transmission apparatus included in the serial communication apparatus is provided in an operation unit used by a user to operate the printing apparatus, and a reception apparatus included in the serial communication apparatus receives an instruction by the user from the operation unit, and is provided in a control unit for controlling an operation of the printing apparatus.

The invention is particularly advantageous since it is possible to perform communication regardless of the number of bits of data in one frame even if the cycle of a transmission clock fluctuates in a range of a maximum of, for example, 0 to −33% with respect to a sampling clock cycle for one bit on the reception side.

Further features of the present invention will become apparent from the following description of exemplary embodiments (with reference to the attached drawings).

BRIEF DESCRIPTION OF THE DRAWINGS

FIGS. 14A and 14B are views showing a specific example of asynchronous serial communication.

FIG. 15 is a view showing the structure of one frame in asynchronous serial communication.

DESCRIPTION OF THE EMBODIMENTS

An Exemplary embodiment of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Moreover, the term "printing element" (to also be referred to as a "nozzle" hereinafter) collectively indicates a discharge orifice or a fluid path communicating with it, and an element for generating energy used to discharge ink, unless otherwise specified.

[Arrangement of Printing Apparatus]

Figure 1:
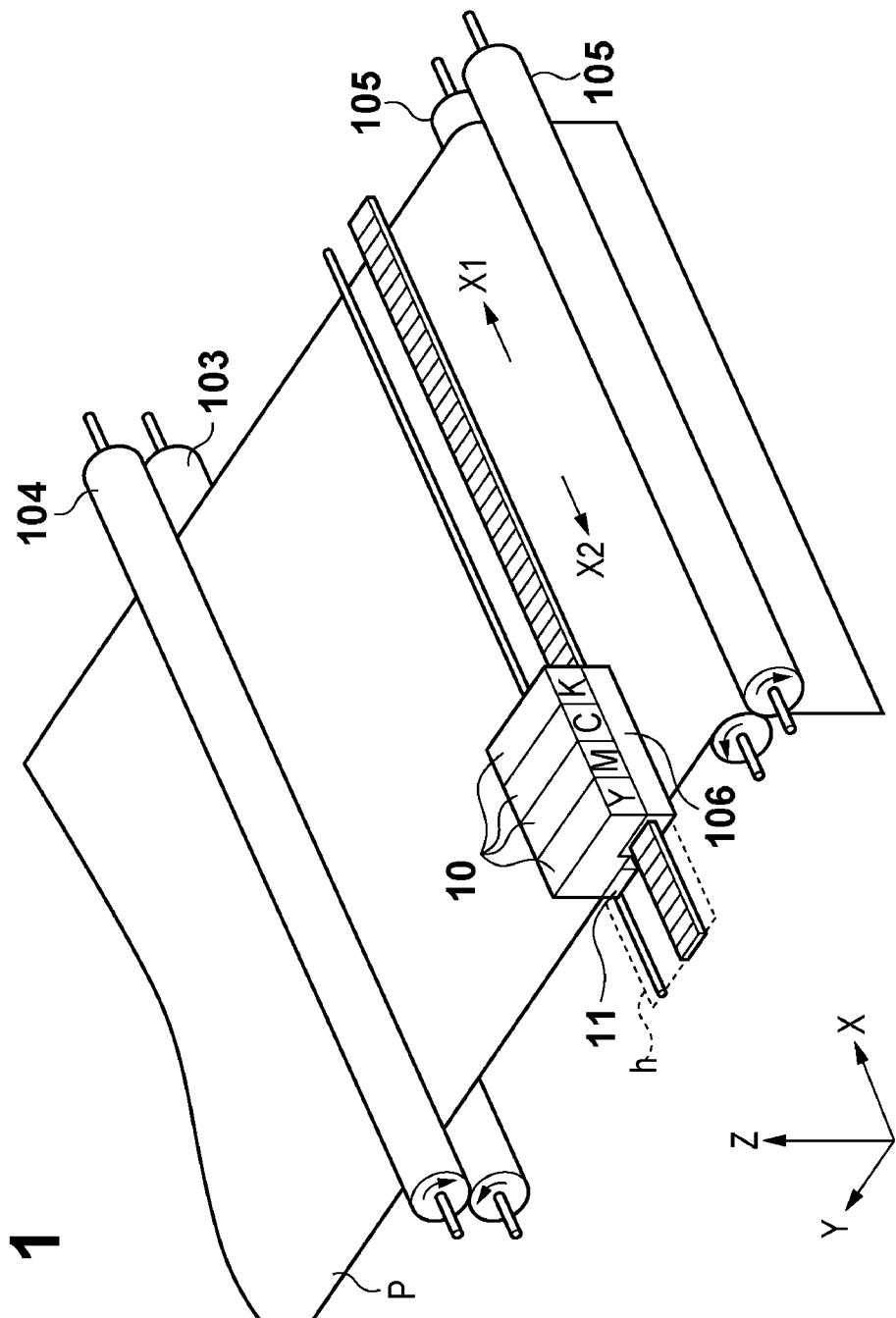
FIG. 1 is a perspective view showing the main part of an inkjet printing apparatus according to an exemplary embodiment of the present invention.

FIG. 1 is a perspective view showing the main part of an inkjet printing apparatus (to be simply referred to as a printing apparatus hereinafter) according to an exemplary embodiment of the present invention.

Referring to FIG. 1, reference numeral 10 denotes four ink cartridges, which include ink tanks and an inkjet printhead (to be simply referred to as a printhead hereinafter) 11 in which a plurality of printing elements are integrated. The ink tanks are filled with black (K) ink, cyan (C) ink, magenta (M) ink, and yellow (Y) ink. The printhead 11 may be arranged separately from the ink tanks. Each printing element of the printhead 11 includes an ink orifice and a corresponding discharge energy generation element. A heater (heat resistance element), a piezo element, or the like is used as the discharge energy generation element. A portion including such an ink orifice and discharge energy generation element will also be referred to as a "nozzle" hereinafter.

A conveyance roller 103 intermittently conveys a printing paper sheet (printing medium) P in the direction of an arrow Y when it rotates in the direction of an arrow together with an auxiliary roller 104 rotating in the direction of an arrow while pressing the printing medium P. Feed rollers 105 feed the printing medium P while pressing it, similarly to the conveyance roller 103 and auxiliary roller 104. The four ink cartridges 10 are mounted on a carriage 106, which reciprocates in the direction of an arrow X (the main scanning direction). In the following description, the −X direction will be referred to as a forward direction X1, and the +X direction will be referred to as a reverse direction X2. The main scanning direction intersects the sub-scanning direction. In this example, these directions intersect at right angles. When printing is not performed or recovery processing for the printhead 11 is performed, the carriage 106 moves to a home position h indicated by dotted lines in FIG. 1 to stand by.

[Overview of Control Arrangement of Printing Apparatus]

Figure 2:
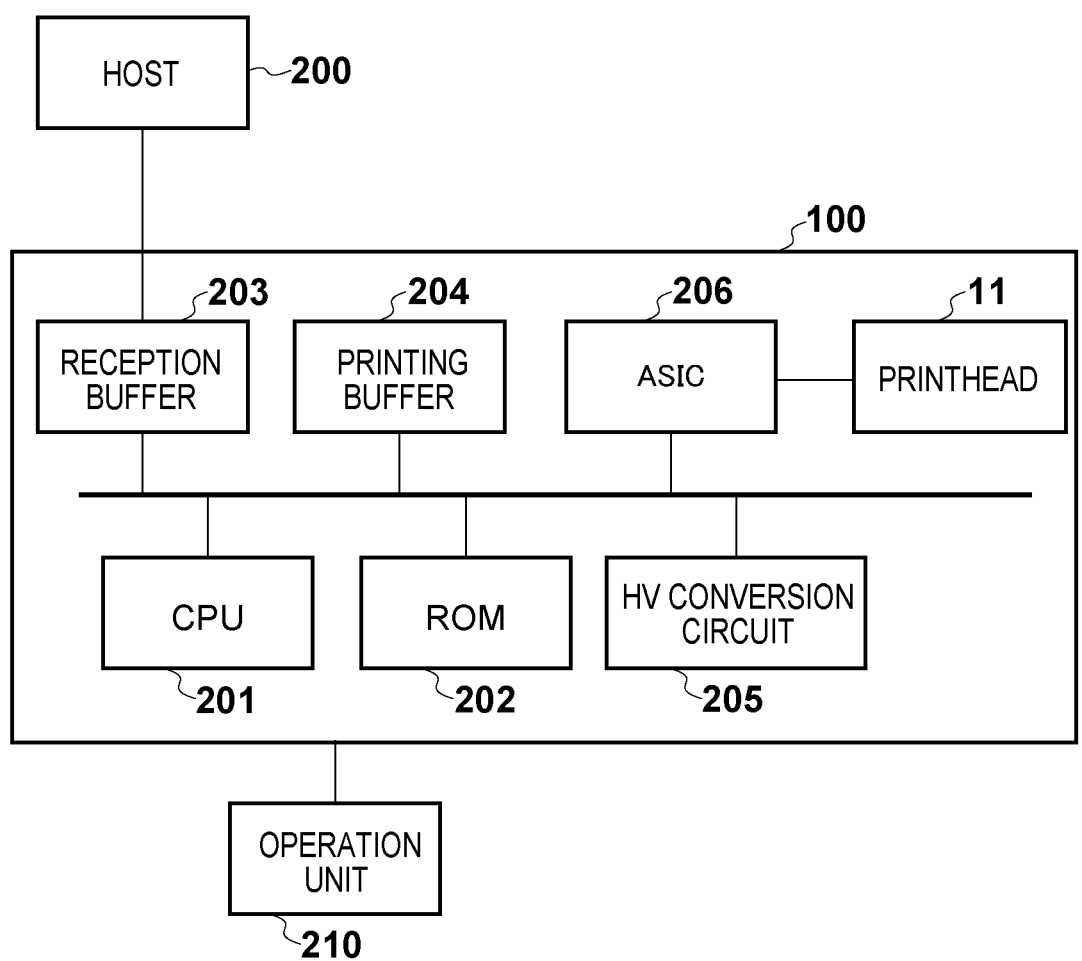
FIG. 2 is a block diagram showing the arrangement of a control circuit in a printing apparatus 100.

FIG. 2 is a block diagram showing the arrangement of a control circuit in a printing apparatus 100. In the printing apparatus 100, reference numeral 201 denotes a CPU; and 202, a ROM which stores control programs to be executed by the CPU 201. Raster image data received from a host 200 is stored in a reception buffer 203 first. The image data stored in the reception buffer 203 is compressed to decrease the amount of transmission data from the host 200. The CPU 201 or a circuit (not shown) for decompressing compressed data, therefore, decompresses the image data, and stores it in a printing buffer 204. The printing buffer 204 is, for example, a DRAM. Data stored in the printing buffer 204 has a raster format. The capacity of the printing buffer 204 is such that it is possible to store data for the number of rasters corresponding to a width which is printed by one scan.

The image data stored in the printing buffer 204 undergoes HV conversion processing executed by an HV conversion circuit 205, and is then stored in, for example, an SRAM nozzle buffer (not shown) included in an ASIC 206. That is, the nozzle buffer stores data in a column format. This data format is compatible with the arrangement of the nozzles. Note that the printing apparatus 100 comprises an operation unit including keys used by the user to perform various operations, an LED lamp indicating the status of the printing apparatus, and an LCD.

Figure 3:
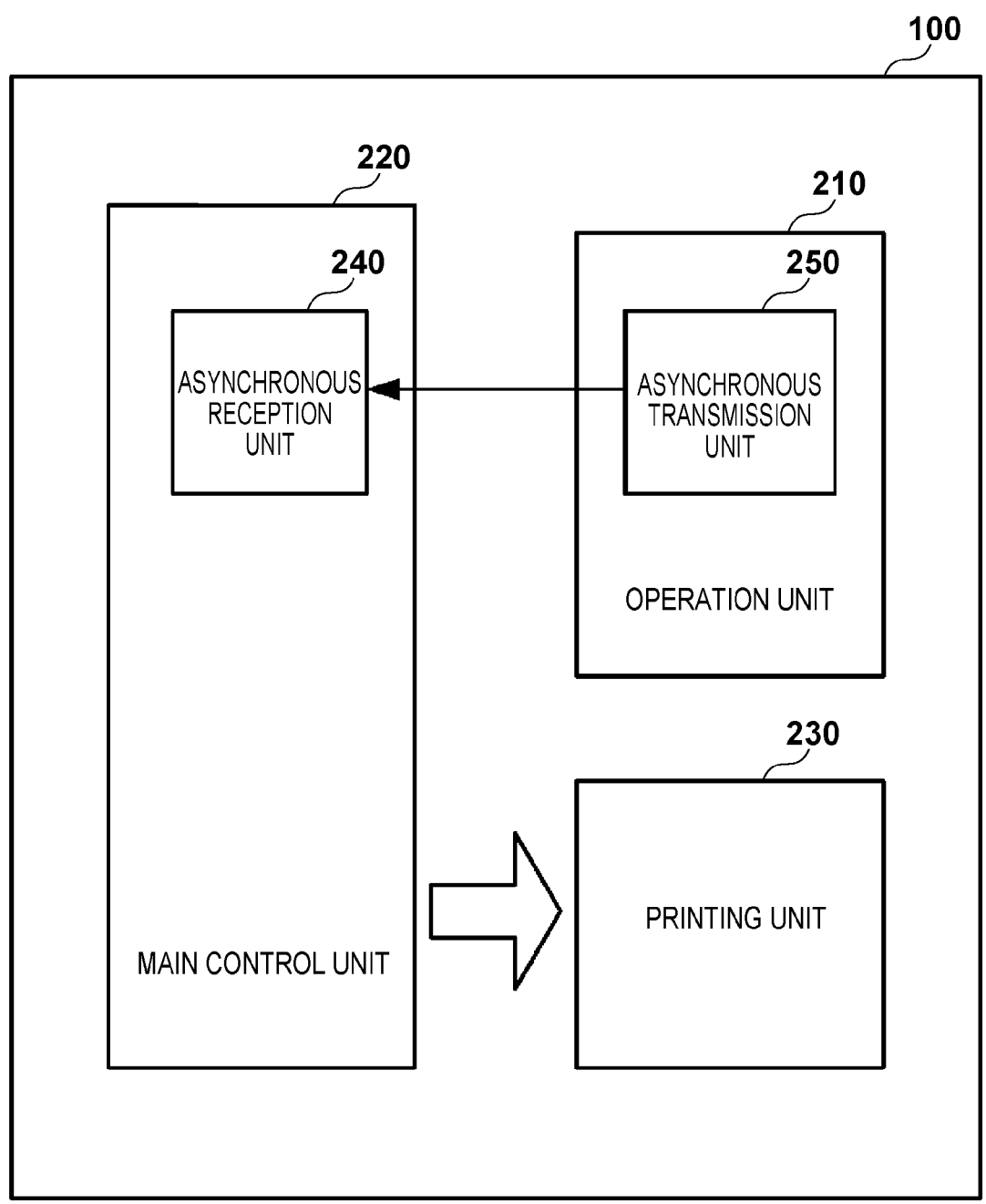
FIG. 3 is a block diagram showing the arrangement of the printing apparatus to emphasize the characteristics of the present invention.

FIG. 3 is a block diagram showing the arrangement of the printing apparatus to emphasize the characteristics of the present invention.

As shown in FIG. 3, the printing apparatus 100 is functionally divided into an operation unit 210 for operating the printing apparatus, a main control unit 220 for controlling the printing apparatus as a whole, and a printing unit 230 for printing. The main control unit 220 incorporates an asynchronous reception unit 240, and the operation unit 210 incorporates an asynchronous transmission unit 250. Data is generated based on key input information input by a user key operation, and is then transmitted to the main control unit using an asynchronous serial communication method.

As is apparent from FIG. 3, the operation unit 210 and the main control unit 220 are connected with each other using an asynchronous serial communication method. Although an asynchronous serial communication method is used for communication between the operation unit 210 and main control unit 220 of the printing apparatus in this example, the present invention is not limited to this. For example, any multi-function printer (MFP) including a scanner unit may be used for communication when image data read by the scanner unit is transmitted to the main control unit.

Figure 4:
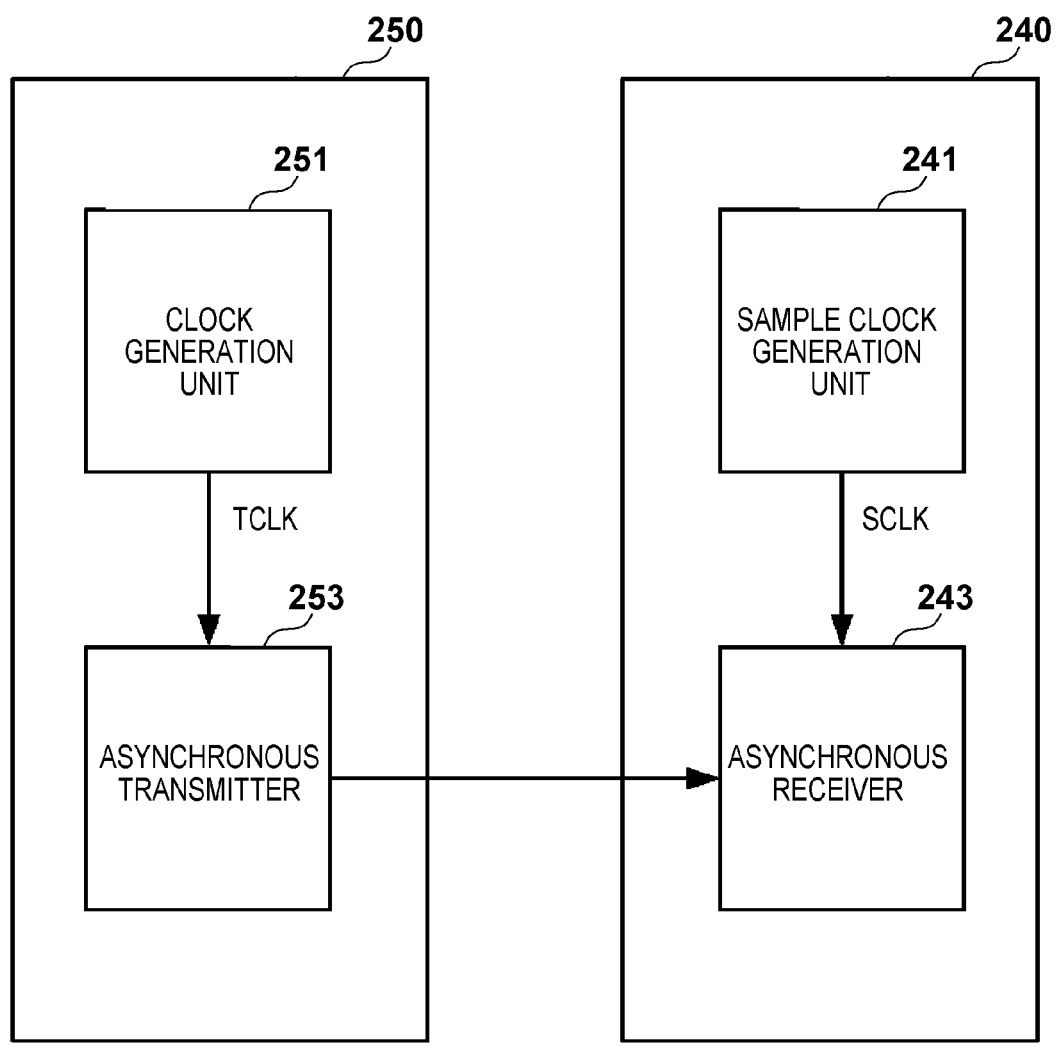
FIG. 4 is a block diagram showing the arrangement of an asynchronous transmission unit 250 and an asynchronous reception unit 240 and connection between the asynchronous transmission unit and the asynchronous reception unit 240.

FIG. 4 is a block diagram showing the arrangement of the asynchronous transmission unit 250 and the asynchronous reception unit 240, and connection between the asynchronous transmission unit 250 and the asynchronous reception unit 240.

As shown in FIG. 4, the asynchronous transmission unit 250 includes a clock generation unit 251 for generating a transmission clock (TCLK), and an asynchronous transmitter 253 for transmitting data in synchronism with the clock signal. On the other hand, the asynchronous reception unit 240 includes a sample clock generation unit 241 for generating a sampling clock (SCLK), and an asynchronous receiver 243 for sampling and receiving transmitted data in synchronism with the sampling clock signal.

Figure 5:
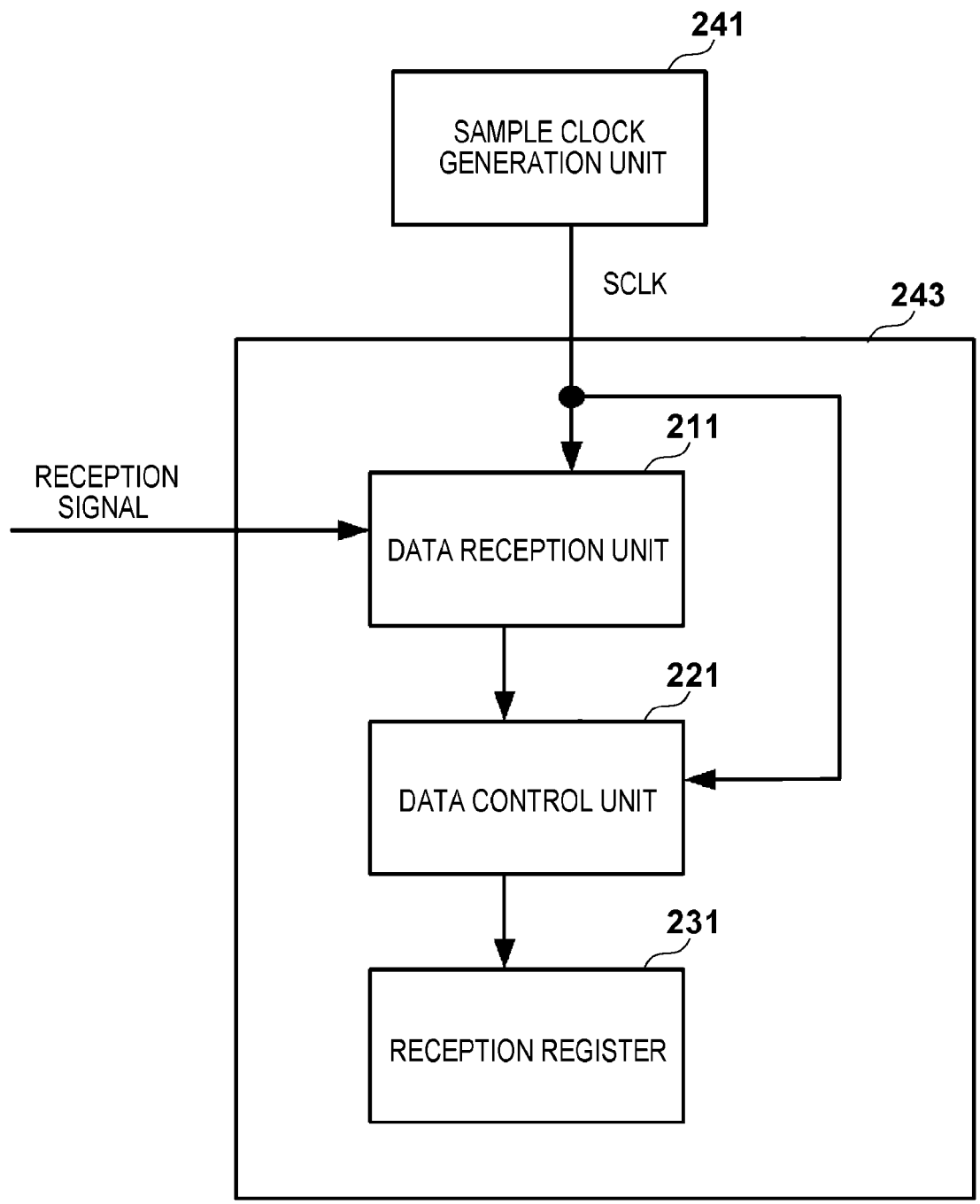
FIG. 5 is a block diagram showing the detailed arrangement of an asynchronous receiver 243.

FIG. 5 is a block diagram showing the detailed arrangement of the asynchronous receiver 243.

As shown in FIG. 5, a data reception unit 211 samples, in synchronism with the sampling clock (SCLK), a signal (to be referred to as a "reception signal") transmitted from the asynchronous transmitter 253, and transfers the obtained result to a data control unit 221. The data control unit 221 analyzes the received sampled data. If the data control unit 221 determines that the received data is valid reception data, it receives the reception data by writing it at a corresponding bit position in a reception register 231.

First Embodiment

Figure 6:
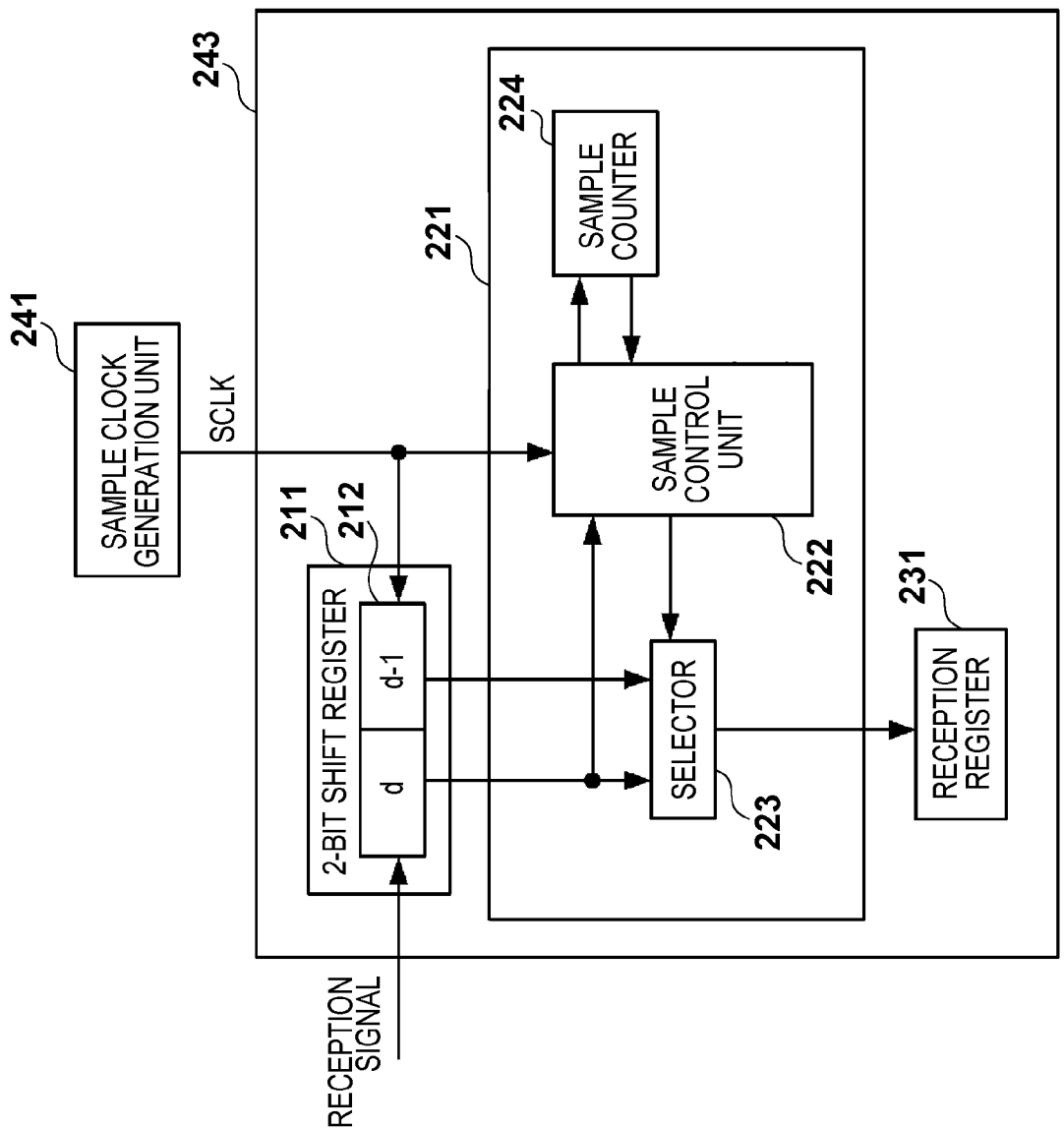
FIG. 6 is a block diagram showing one embodiment of the asynchronous receiver shown in FIG. 5.

FIG. 6 is a block diagram showing one embodiment of the asynchronous receiver 243 shown in FIG. 5.

As shown in FIG. 6, the data reception unit 211 includes a 2-bit shift register 212 for temporarily storing reception data, which shifts, every time a reception signal is sampled, the sampled data from an address d to an address d−1 within the register. Therefore, the latest sampled data is stored at the address d, and data sampled one clock before is stored at the address d−1. A sample control unit 222 outputs, to the reception register 231, valid data of the sampled data held in the shift register 212 according to a condition such as a sampling count or the number of successive data. A sample counter 224 holds the sampling count. In other words, the sample counter 224 is a reception counter.

A selector 223 of the data control unit 221 outputs, to the reception register 231, the data held at the address d or d−1 in response to an instruction of the sample control unit 222. In this case, when the sample counter 224 counts the pulse of the sampling clock (SCLK) a predetermined number of times, it notifies the sample control unit 222 of it.

The basic operation of serial communication according to this embodiment will be described. Note that an apparatus including an asynchronous transmitter will be referred to as a transmission apparatus and an apparatus including an asynchronous receiver will be referred to as a reception apparatus. Furthermore, an apparatus including the transmission apparatus and the reception apparatus will be referred to as a serial communication apparatus.

Assume that T represents the maximum cycle of the transmission clock (TCLK) of the asynchronous transmitter 253. In this case, the cycle of the sampling clock (SCLK) of the asynchronous receiver 243 is set to meet T/n (n is a natural number of 3 or larger). Assume that the cycle of transmission clock 1 is set to the maximum cycle T, and the cycle of transmission clock 2 is set to be shorter by 25% than the cycle of transmission clock 1.

If there is no deviation between the transmission clock (TCLK) and the sampling clock (SCLK), that is, if a time during which the sampling clock is counted n times is always T, a reception signal is sampled in synchronism with the sampling clock (SCLK). Every time the sampling clock is counted n times, data at the address d of the shift register 212 is stored at a corresponding bit position in the reception register, and the count value of the sample counter 224 is reset.

An operation when there is a deviation between the transmission clock (TCLK) and the sampling clock (SCLK) (for example, there is a difference between the cycle T and a time during which the sampling clock is counted n times) or when the cycle T fluctuates with respect to the sampling clock will be described next.

Figure 7:
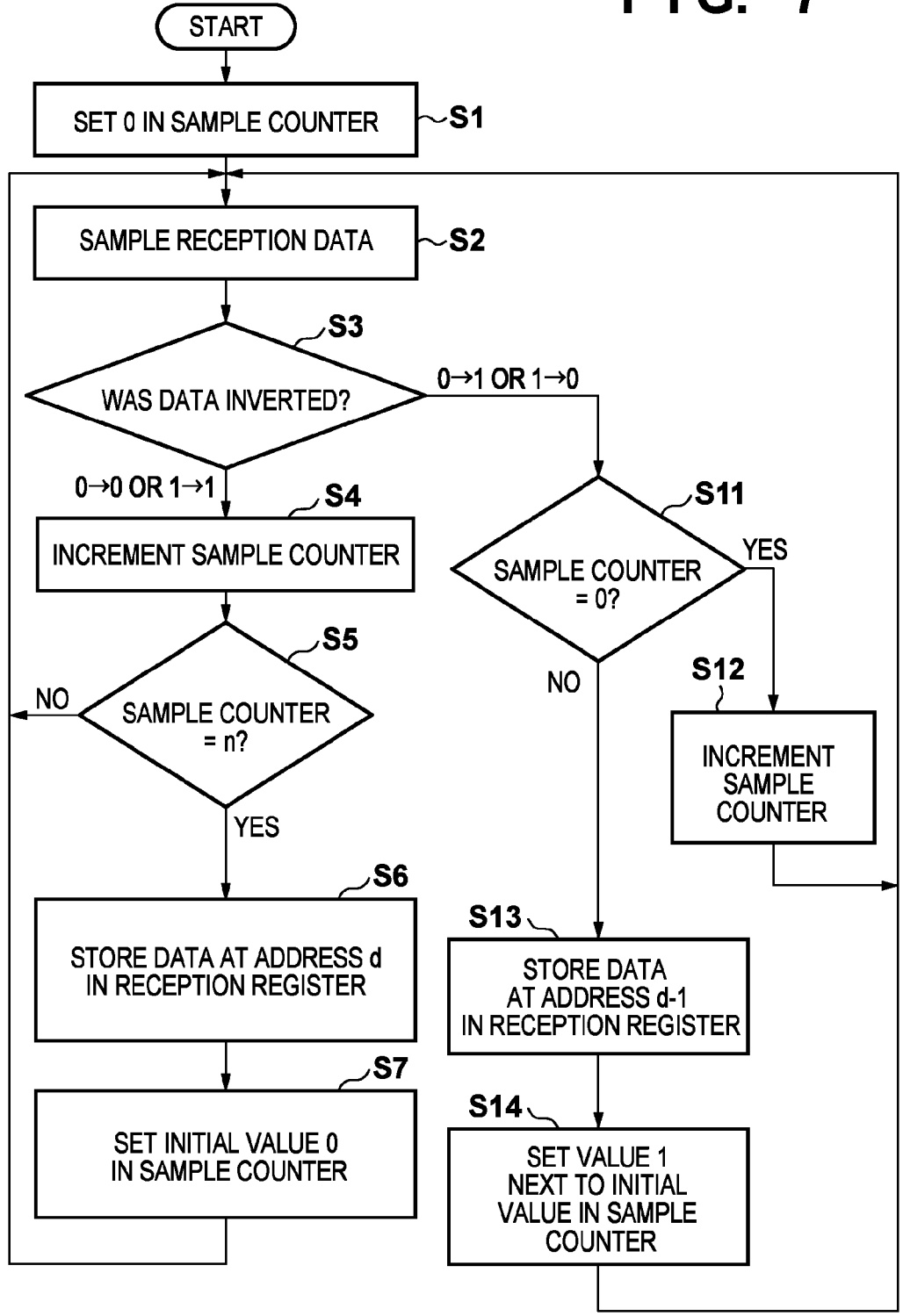
FIG. 7 is a flowchart illustrating the operation of the asynchronous receiver shown in FIG. 6.

FIG. 7 is a flowchart illustrating processing executed by the asynchronous receiver 243. The operation of the asynchronous receiver 243 will be described in detail according to this flowchart. Note that n=4.

Prior to data reception, the count value of the sample counter 224 is reset in step S1 (0 is set). In step S2, sampling of a reception signal starts, and the sampled data is input to the shift register 212 every time sampling is performed. The sample control unit 222 monitors the sampled data (data input to the address d), and checks in step S3 whether or not the data was inverted. That is, the sample control unit 222 checks whether or not data at the address d≠data at the address d−1. If the data was not inverted (the data are identical), the process advances to step S4, and the count value (SCNT) of the sample counter 224 is incremented by "+1".

Then, it is checked in step S5 whether or not the count value of the sample counter 224 is equal to n. If SCNT≠n, the process returns to step S2 to perform next data sampling. On the other hand, if SCNT=n, data for one bit has been received, and the process advances to step S6 to store, at a corresponding bit position in the reception register 231, the data held at the address d through the selector 223 in response to an instruction from the sample control unit 222. After that, the count value of the sample counter 224 is reset in step S7 (an initial value 0 is set). Then, the process returns to step S2 to perform next data sampling.

In a case where it is judged in step S3 that the data was inverted, the process advances to step S11 to check whether or not the count value of the sample counter 224 is "0". If SCNT=0, the data was not inverted in the middle of n sampling operations, and the process advances to step S12 to increment the count value of the sample counter 224 by "+1". After that, the process returns to step S2 to perform next data sampling. On the other hand, if SCNT≠0, the process advances to step S13.

In step S13, the data held at the address d−1 of the shift register 212 is stored at a corresponding bit position in the reception register 231 through the selector 223 in response to an instruction from the sample control unit 222.

In step S14, a value "1" next to the initial value is set in the sample counter 224. In this way, by setting a predetermined value in the sample counter 224, a sampling timing is re-synchronized. After that, the process returns to step S2 to perform next data sampling.

Figure 8:
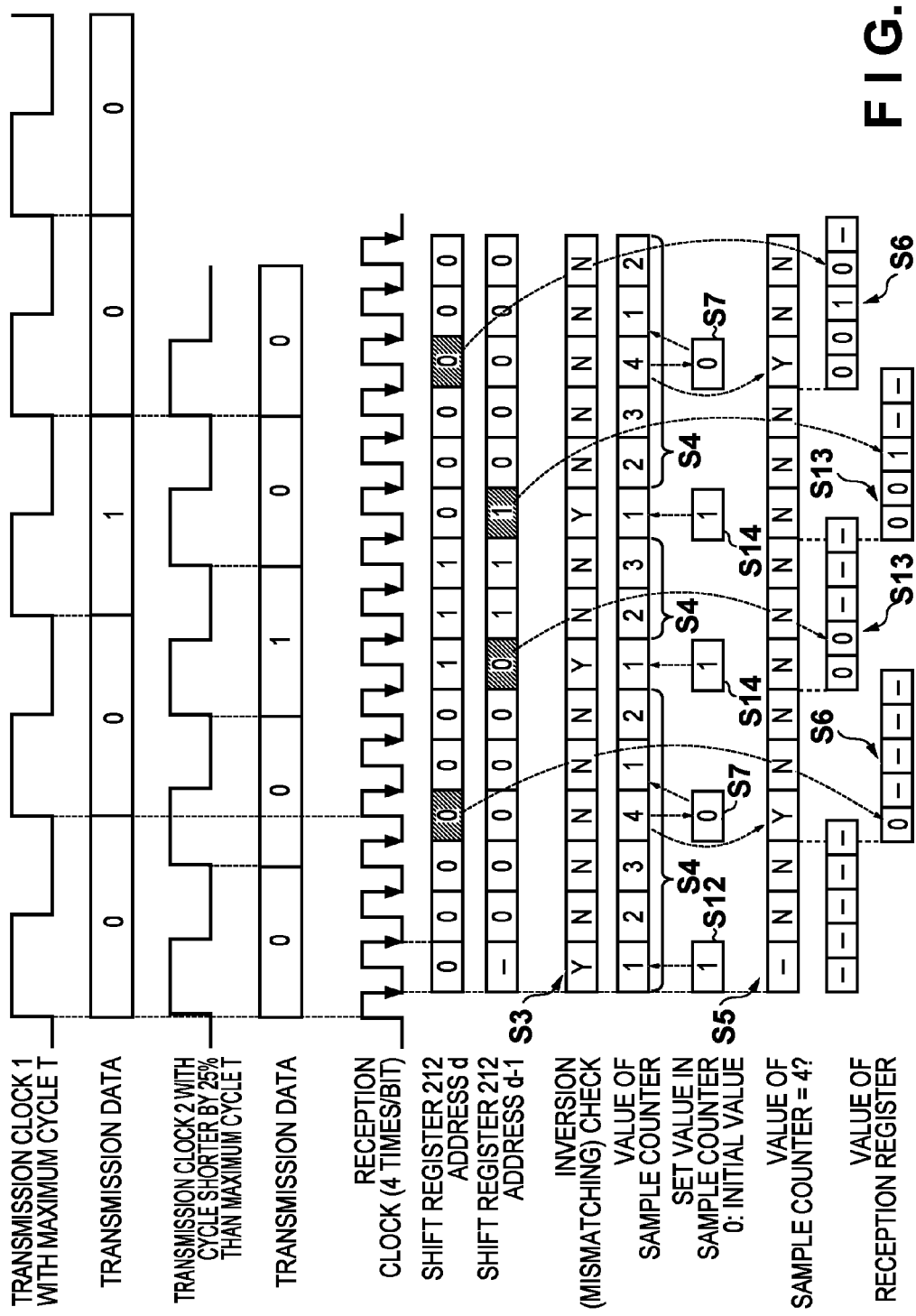
FIG. 8 is a view for explaining the operation of the asynchronous receiver shown in FIG. 6.

FIG. 8 is a view for explaining the operation of the asynchronous receiver 243 which operates according to the flowchart of FIG. 7. FIG. 8 shows processing when n=4 in the flowchart of FIG. 7. That is, when one data is sampled four times in synchronism with a sampling clock having a cycle equal to a quarter of the cycle of transmission clock 1, it is stored as valid data in the reception register.

The asynchronous transmitter 253 transmits data in synchronism with not transmission clock 1 having the maximum cycle T but transmission clock 2 having a cycle shorter by 25% than the maximum cycle T. Since, therefore, the asynchronous receiver 243 operates in synchronous with the reception clock assuming transmission clock 1, a time for one bit actually corresponds to only three cycles of the sampling clock.

FIG. 8 shows a case in which data is input to the shift register at a trailing edge of the reception clock. For example, "0" is input to the address d at the first trailing edge of the reception clock. The data held at the address d is set at the address d−1 at the second trailing edge of the reception clock, and "0" is input to the address d. Furthermore, "1" is input to the address d at the seventh trailing edge of the reception clock.

FIG. 8 also shows the determination result (Y or N) in step S3 of FIG. 7, and setting of the value of the sample counter (reception counter) 224. Furthermore, FIG. 8 shows update of the value of the sample counter 224 in step S4 of FIG. 7, and settings in steps S7, S12, and S14 of FIG. 7. Storage of data in the reception register is also shown in FIG. 8. For example, the sample counter 224 is counted up in step S4, and the value of the sample counter 224 reaches a predetermined value (4). Therefore, YES is determined in the determination processing in step S5, and the processing in step S6 is executed. In step S6 of FIG. 7, the data "0" (indicated by hatch lines) held at the address d of the shift register 212 is stored in the first bit of the reception register.

On the other hand, as a result of determining in step S3 of FIG. 7 that the data was inverted (Y), the data "0" (indicated by hatch lines) held at the address d−1 is stored in the second bit of the reception register in step S13 of FIG. 7. Then, to re-synchronize data sampling, the value "1" next to the initial value "0" is set in the sample counter 224 in step S14.

The above-described arrangement enables to appropriately receive data even if there is a deviation between the transmission clock (TCLK) and the sampling clock (SCLK).

Second Embodiment

If, however, there is a large deviation between the transmission clock (TCLK) and the sampling clock (SCLK) or the number of data bits is large, it may be impossible to appropriately receive data. Another embodiment to cope with such a situation will be described below.

In this embodiment, an asynchronous transmitter 253 adds, according to a predetermined rule, dummy data to data to be transmitted to an asynchronous receiver 243, and then transmits the data to the asynchronous receiver 243. More specifically, a dummy bit insertion condition m is determined to meet m≤(n−1) with respect to n. Note that m represents a bit interval at which dummy bits are inserted.

If there are m successive identical data, the asynchronous transmitter 253 inserts inverted 1-bit dummy data to a data string (for example, if there are m successive "1"s, the asynchronous transmitter 253 inserts "0" as a dummy bit to a data string). That is, if there are m successive identical data, the asynchronous transmitter 253 adds, as 1-bit dummy data, a value different from the data to a data string. On the other hand, the asynchronous receiver 243 discards, as invalid data, 1-bit inverted data following the m successive identical data (for example, "0" following the m successive "1"s is invalidated as a dummy bit). The above operation is defined as a communication protocol between the asynchronous transmitter and the asynchronous receiver. Note that a method of determining m will be described later since it is determined based on the number n of sampling operations and a deviation between the transmission clock and the sampling clock. An overview of the arrangement and operation of the asynchronous receiver in this case is as follows.

Figure 9:
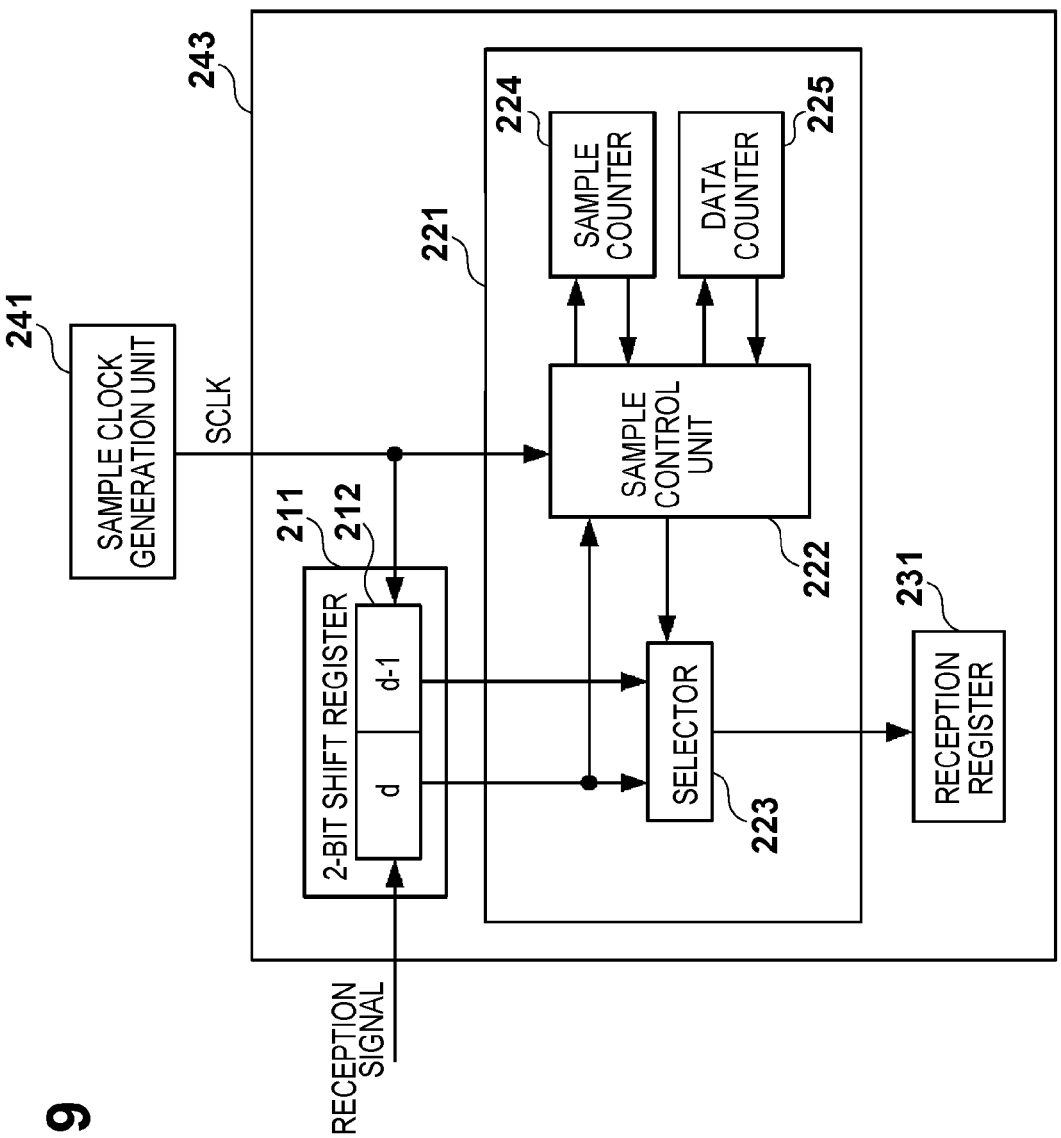
FIG. 9 is a block diagram showing another embodiment of an asynchronous receiver.

FIG. 9 is a block diagram showing another embodiment of the asynchronous receiver 243 shown in FIG. 5. As shown in FIG. 9, the asynchronous receiver 243 has an arrangement obtained by adding a data counter 225 to the arrangement shown in FIG. 7. Similarly to the above-described case in which there is no frequency error, the asynchronous receiver 243 stores, at a corresponding bit position in a reception register 231, data at an address d of a shift register 212 every time the sampling clock (SCLK) is counted n times. If the data was inverted in the middle of sampling for one bit, that is, in the middle of n sampling operations, the asynchronous receiver 243 stores, at a corresponding bit position in the reception register 231, data one clock before, that is, data at an address d−1 of the shift register 212. At the same time, the asynchronous receiver 243 sets 1 in the sample counter 224. This operation enables to re-synchronize a sampling timing every time reception data is inverted. If the data was inverted after m successive identical data appear, the inverted data is determined as a dummy bit, that is, invalid data. The asynchronous receiver 243 does not store the invalid data in the reception register 231.

In summary, the asynchronous receiver operates to be able to re-synchronize a sampling timing every time inverted data is detected. On the other hand, if there are successive identical data for several bits, re-synchronization is impossible, and the asynchronous receiver is unable to process data. If, therefore, there are successive identical data for m bits, a dummy bit is inserted to achieve re-synchronization.

Figure 10:
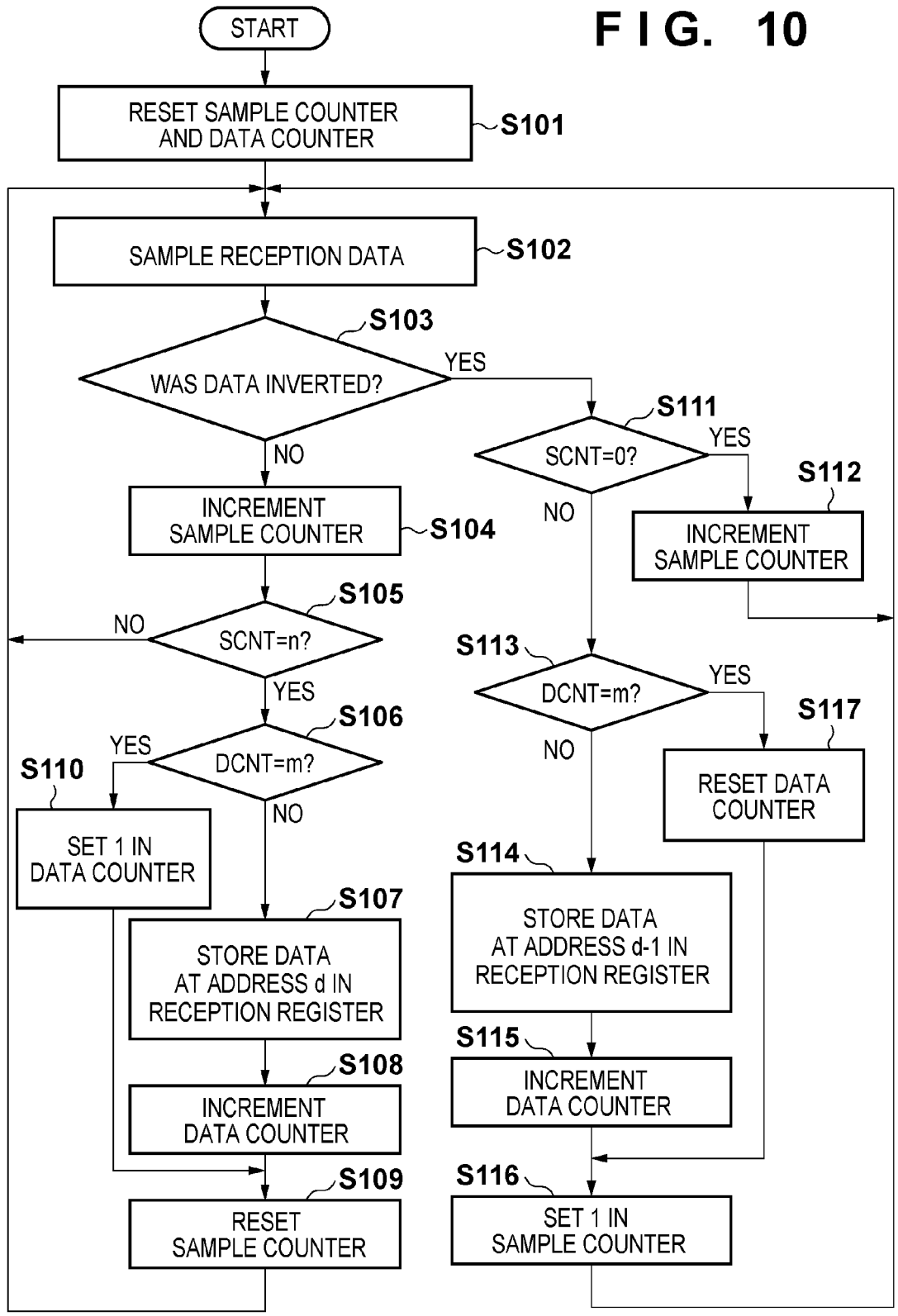
FIG. 10 is a flowchart illustrating the operation of the asynchronous receiver having the arrangement shown in FIG. 9.

FIG. 10 is a flowchart illustrating processing on the reception side in a serial communication method.

The operation of the asynchronous receiver will now be described in detail according to this flowchart.

Prior to data reception, the count values of the sample counter (reception counter) 224 and data counter 225 are reset in step S101. In step S102, sampling of a reception signal starts, and the sampled data is input to the shift register 212 every time sampling is performed. The sample control unit 222 monitors the sampled data (data at the address d of the shift register), and checks in step S103 whether or not the data was inverted (that is, whether d≠d−1). If the data was not inverted, the process advances to step S104, and the count value (SCNT) of the sample counter 224 is incremented by "+1".

Then, it is checked in step S105 whether or not the count value of the sample counter 224 is equal to n. If SCNT≠n, the process returns to step S102 to perform next data sampling. On the other hand, if SCNT=n, data for one bit has been received, and the process advances to step S106 to check whether or not the count value (DCNT) of the data counter 225 is equal to m. If DCNT≠m, the data is valid, and the process advances to step S107 to store, at a corresponding bit position in the reception register 231, the data at the address d through the selector 223 in response to an instruction from the sample control unit 222. After that, the count value of the data counter 225 is incremented by "+1" in step S108 and the count value of the sample counter 224 is reset in step S109. Then, the process returns to step S102 to perform next data sampling.

If DCNT=m in step S106 on the other hand, the received data is dummy data, that is, invalid data. The reception register 231, therefore, does not store the data, and the process advances to step S110 to set "1" in the data counter 225. After that, the process advances to step S109 to reset the count value of the sample counter 224. Then, the process returns to step S102 to perform next data sampling.

In a case where it is judged in step S103 that the data was inverted, the process advances to step S111 to check whether or not the count value of the sample counter 224 is "0". If SCNT=0, the data was not inverted in the middle of n sampling operations, and the process thus advances to step S112 to increment the count value of the sample counter 224 by "+1". After that, the process returns to step S102 to perform next data sampling. On the other hand, if SCNT≠0, the process advances to step S113 to check whether or not the count value of the data counter 225 is equal to m, that is, whether or not the data is a dummy bit following m successive identical data.

If DCNT≠m, the process advances to step S114. Data sampled one clock before, that is, data at the address d−1 of the shift register 212 is stored at a corresponding bit position in the reception register 231 through the selector 223 in response to an instruction from the sample control unit 222. Then, the count value of the data counter 225 is incremented by "+1" in step S115.

A sampling timing is re-synchronized by setting "1" in the sample counter 224 in step S116. Then, the process returns to step S102 to perform next data sampling. Note that if DCNT=m in step S113, the preceding sampling data is a dummy bit. Therefore, the count value of the data counter 225 is reset in step S117 without storing the data. Then, a sampling timing is re-synchronized by setting "1" in the sample counter 224 in step S116. After that, the process returns to step S102 to perform next data sampling.

Figure 11:
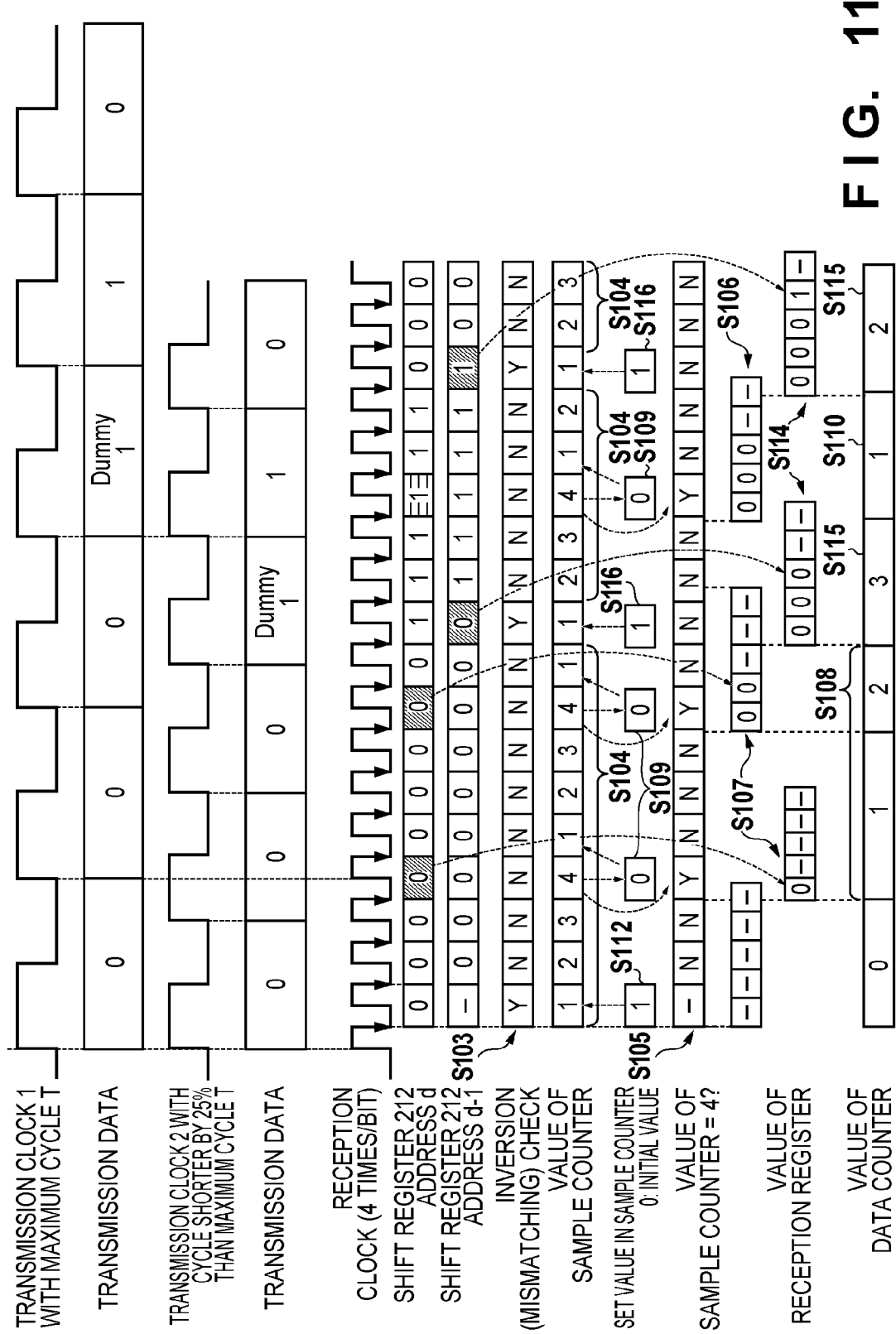
FIG. 11 is a view for explaining the operation of the asynchronous receiver shown in FIG. 9.

FIG. 11 is a view for explaining the operation of the asynchronous receiver 243 which operates according to the flowchart of FIG. 10. For descriptive convenience, FIG. 11 shows a case in which 6-bit data "000110" output from the asynchronous transmitter 253 according to transmission clock 2 is received according to the reception clock, similarly to FIG. 8. FIG. 11 shows a case in which the value of data input to the shift register and the value of the sample counter are updated, similarly to FIG. 8. FIG. 11 also shows a case in which the value of the data counter is updated. Furthermore, FIG. 11 shows a case in which the value of the data counter is updated in steps S108, S110, and S115 of FIG. 10.

Processing on the transmission side in asynchronous serial communication will be described next.

Figure 12:
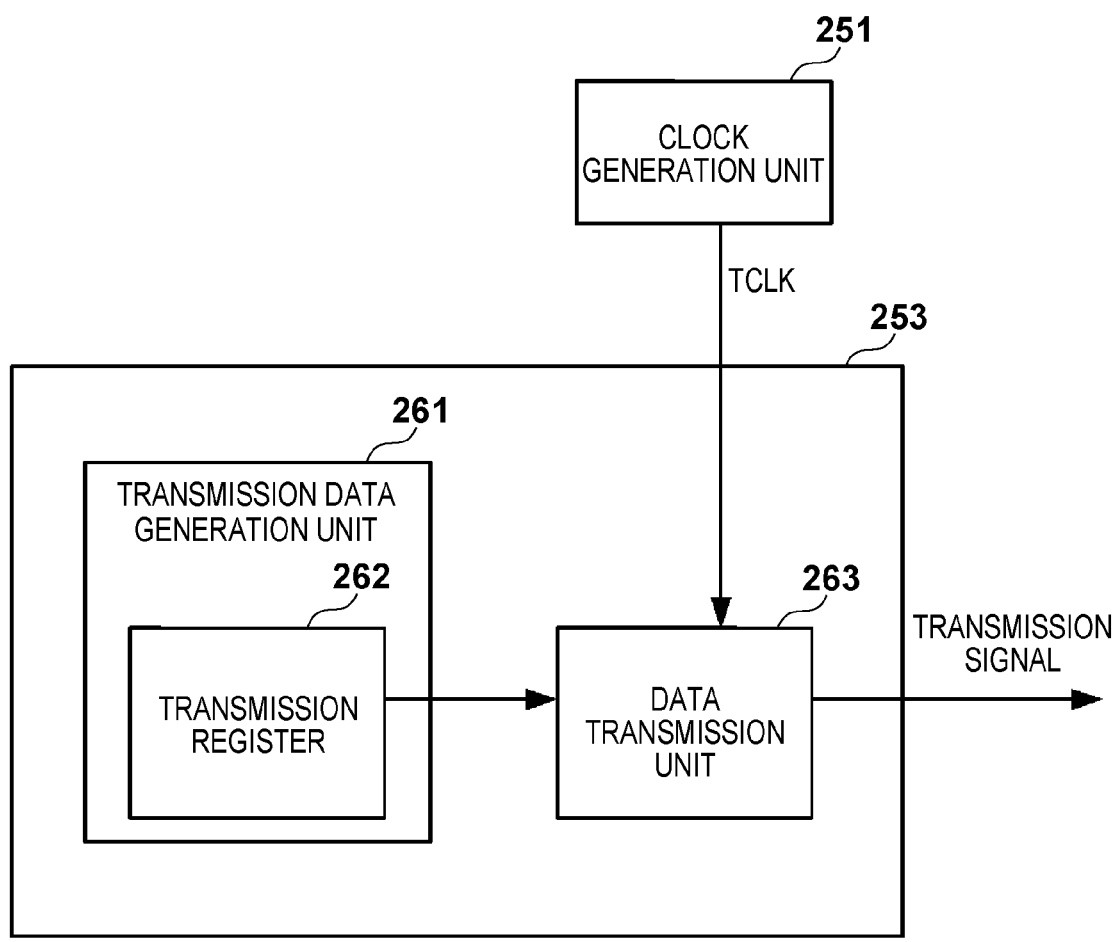
FIG. 12 is a block diagram showing the detailed arrangement of an asynchronous transmitter 253.

FIG. 12 is a block diagram showing the detailed arrangement of the asynchronous transmitter 253.

As shown in FIG. 12, a transmission data generation unit 261 generates transmission data by adding, as needed, a dummy bit to data which the asynchronous transmitter wants to transmit, and stores the generated data in a transmission register 262. A data transmission unit 263 reads out the transmission data stored in the transmission register 262, and transmits it in synchronism with the transmission clock (TCLK) generated by the clock generation unit 251.

Figure 13:
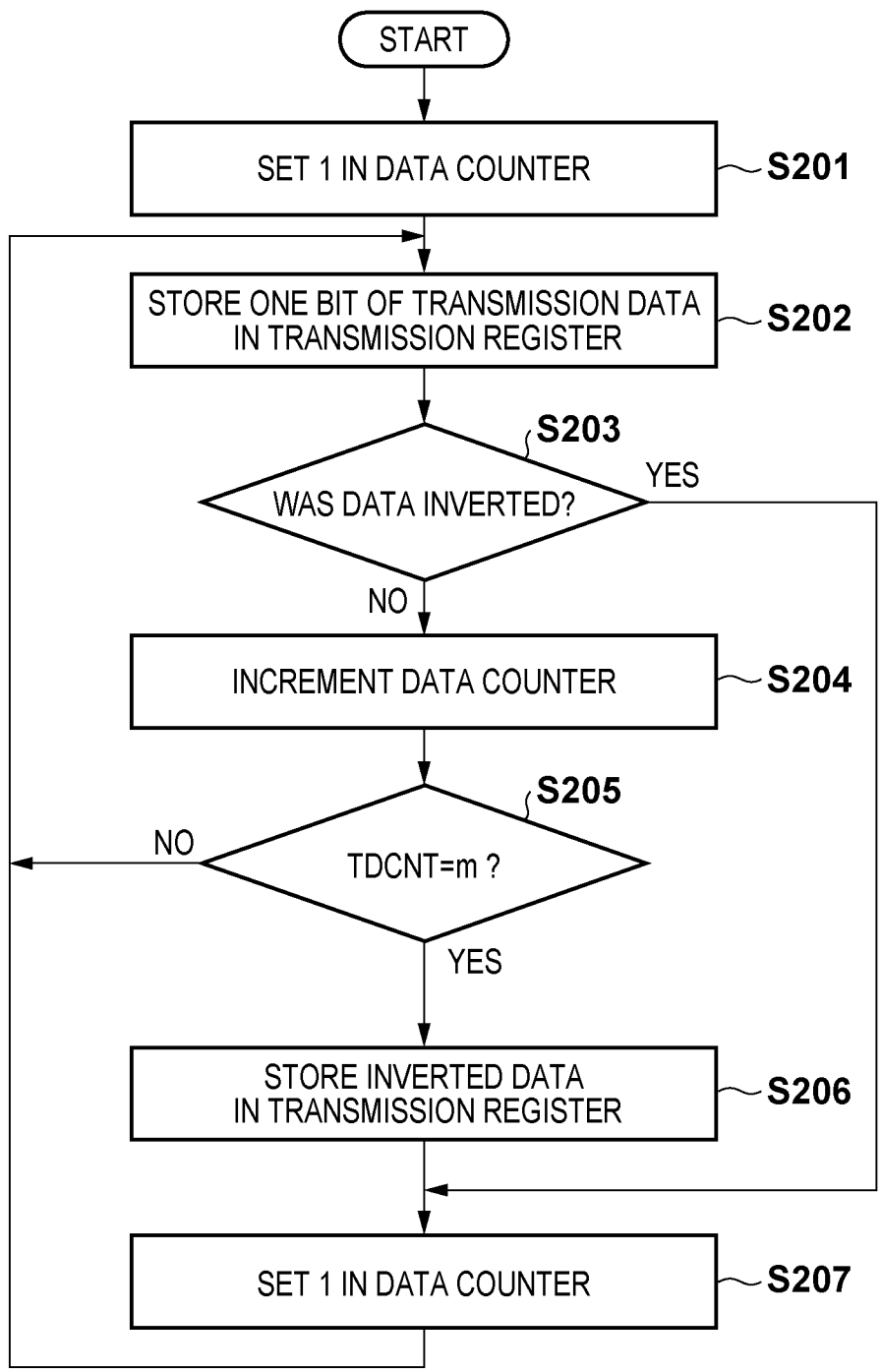
FIG. 13 is a flowchart illustrating the operation of the asynchronous transmitter.

FIG. 13 is a flowchart illustrating the operation of the asynchronous transmitter.

The processing on the transmission side will be described according to the flowchart.

Since a start bit is always "0", "1" is set in a data counter (not shown) in step S201. Then, one bit of data which the asynchronous transmitter wants to transmit is stored in the transmission register 262 in step S202, and is compared with bit data one clock before in step S203. That is, it is checked whether or not the data was inverted.

If the data is equal to that in the preceding bit, the process advances to step S204 to increment the count value (TDCNT) of the data counter by "+1". It is then checked in step S205 whether or not the count value is equal to m. If TDCNT≠m, the process returns to step S202 to store a next bit in the transmission register 262.

On the other hand, if TDCNT=m, the process advances to step S206 to store the inverted data (for example, "1" if the data stored in step S202 is "0") as dummy data in the transmission register 262. Then, "1" is set in the data counter in step S207 and the process returns to step S202.

In a case where it is judged in step S203 that the data was inverted with respect to the preceding bit, the process advances to step S207 to set "1" in the data counter. Then, the process returns to step S202 to store a next bit in the transmission register 262.

The above-described processing is repeated, thereby transmitting the data.

A method of determining a dummy bit insertion condition m will be described next.

In a target communication system, a value (TS) obtained by subtracting, from a maximum cycle T, a difference between the largest value (that is, when data is transmitted at the maximum cycle T) and the smallest value (that is, a transmission time when the cycle of the transmission clock fluctuates with a smallest value) of a transmission time for the possible number of bits of successive identical data is checked. That is, if TS<T/n, it is necessary to insert a dummy bit under the condition that m≤n−1.

A description will be provided using a mathematical expression for descriptive convenience. If a fluctuation amount of the cycle of the transmission clock (TCLK) is −A % and the possible number of bits of the successive identical data is C, a difference Δd between the largest value and the smallest value of a transmission time for C bits is given by:

$$\Delta d = C \times T - C \times T(1-A/100)$$

If TS=(T−Δd)<T/n, it is necessary to insert a dummy bit.

FIGS. 14A and 14B are views showing a specific example of asynchronous serial communication. In this example, a dummy bit insertion condition is m=3. FIG. 14A shows an operation on the asynchronous transmitter side. FIG. 14B shows an operation on the asynchronous receiver side.

The operation on the transmission side will first be described.

Data which the asynchronous transmitter wants to transmit is shown in the uppermost portion of FIG. 14A, under which a data string to be actually transmitted that has been added with dummy bits under the dummy bit insertion condition of m=3 is shown. In this example, the data which the transmitter wants to transmit is "00011110100" including overhead bits such as a start bit. Since m=3, however, the actually transmitted data is "0001110110100". Under this data, a transmission signal transmitted by the data transmission unit 263 and a transmission clock (TCLK) are shown, thereby indicating that the transmission data is transmitted in synchronism with the transmission clock (TCLK).

The operation on the receiver side will be described next.

FIG. 14B shows a case in which data is transmitted according to the transmission clock with a cycle shorter by 25% than the maximum cycle T of the transmission clock (a frequency 1.33 times higher than that of the transmission clock). The number of samples of the receiver is set to n=4. Arrows in the uppermost portion of FIG. 14B indicate sampling timings. Numbers above the arrows indicate the counter value of the sample counter in sampling. Under the arrows, the length of a data string for one frame in the case of the maximum cycle T is shown for reference purpose, under which a reception signal actually transferred on a communication line is shown.

The reception signal is identical to the transmission signal for the transmitter shown in FIG. 14A, as a matter of course. Under the reception signal, reception data which has been stored in the reception register 231 by performing sampling control for the reception signal is shown.

An overview of the reception operation will be described again with reference to FIG. 14B. Since n=4 at timing A in FIG. 14B, sampled data "0" is stored at the first bit position of the reception register 231. Since n=4 at timing B, sampled data "0" is stored at the second bit position of the reception register 231. Since the sampled data is inverted at timing C (YES in step S103 of FIG. 10), the data "0" sampled one clock before is stored at the third bit position of the reception register (step S114 of FIG. 10) and the count value of the sample counter is reset to "1" (step S116 of FIG. 10), thereby achieving re-synchronization. Although n=4 at timing D (YES in step S105 of FIG. 10), data "1" follows the three successive data "0" (that is, m=3 and this indicates YES in step S106 of FIG. 10), the data "1" is therefore determined as a dummy bit, and the process advances to step S110 and step S109, thereby skipping process in step S107 and discarding the data without storing it in the reception register 231. Although inversion of the sampled data is also detected at timing E, the data sampled one clock before is "0" following the three successive data "1" including the dummy bit, which is, therefore, determined as a dummy bit similar to the case at timing D, and is discarded without being stored in the reception register 231.

Repeating the above-described operation receives the data. As a result, data stored in the reception register is "00011110100" which is identical to the data which the transmitter wants to transmit.

According to the above described embodiments, in data serial transfer, by inserting and detecting dummy data to re-synchronize the transmission clock, it is possible to correctly transfer data even if a shift occurs in the transmission clock.

Note that since it is important for the present invention to re-synchronize the sampling clock every time inversion of a reception signal is detected, instead of inserting dummy bits, encoding may be performed not to have m successive identical data, thereby making communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-127651, filed Jun. 7, 2011, which is hereby incorporated by reference herein in its entirety.

What is claimed is:

1. A serial communication apparatus comprising a reception apparatus and a transmission apparatus, wherein:
   the reception apparatus includes:
   a reception unit configured to receive one bit of data in a predetermined cycle;
   a memory unit;
   a reception counter which is updated when the data received by said reception unit has the same value as that of 1-bit data received one cycle before;
   a memory control unit configured to control storage into said memory such that when a value of said reception counter reaches a first value, the data received by said reception unit is stored into said memory, and when the data received by said reception unit is different from the data received one cycle before, the 1-bit data received one cycle before is stored into said memory; and
   a storage counter which is updated when data having the same value is stored into said memory,
   wherein when a value of said storage counter reaches a third value, said memory control unit further controls storage into said memory not to store the data into said memory, and
   the transmission apparatus includes:
   a generation unit configured to generate data;
   an addition unit configured to increment, when 1-bit data of the data generated by said generation unit is the same as preceding 1-bit data, a bit count, and add, when an incremented bit count meets a predetermined condition, inverted data as dummy bit data; and
   a transmission unit configured to transmit the data generated by said generation unit or the dummy bit data added by said addition unit in a second predetermined cycle,
   wherein a maximum cycle (T) of the second predetermined cycle and the predetermined cycle (SCLK) satisfy SCLK=T/n (n is a natural number not less than 3), and
   the predetermined condition is that bit count (m) as a condition for adding the dummy bit data meets m≤n−1.

2. A printing apparatus including a serial communication apparatus according to claim 1, wherein
   a transmission apparatus included in said serial communication apparatus is provided in an operation unit used by a user to operate said printing apparatus, and
   a reception apparatus included in said serial communication apparatus receives an instruction by the user from said operation unit, and is provided in a control unit for controlling an operation of said printing apparatus.

3. A method for operating a serial communication apparatus comprising a reception apparatus and a transmission apparatus, the method comprising:
   at the reception apparatus
   receiving one bit of data in a predetermined cycle;
   updating a reception counter when the data received in the receiving has a same value as that of 1-bit data received one cycle before;
   controlling storage into a memory such that when a value of the reception counter reaches a first value, the data received in the receiving is stored into the memory, and when the data received in the receiving is different from the data received one cycle before, the 1-bit data received one cycle before is stored into the memory, and updating a storage counter when data having the same value is stored into the memory, further controlling storage into the memory not to store the data into the memory, when a value of the storage counter reaches a third value; and at the transmission apparatus generating data;

incrementing, when 1-bit data of the data generated in the generating is the same as preceding data, a bit count, and adding, when an incremented bit count meets a predetermined condition, inverted data as dummy bit data; and transmitting the data generated in the generating or the dummy bit data added in the adding in a second predetermined cycle, wherein a maximum cycle (T) of the second predetermined cycle and the predetermined cycle (SCLK) satisfy SCLK=T/n (n is a natural number not less than 3), and the predetermined condition is that bit count (m) as a condition for adding the dummy bit data meets m≤n−1.

4. A method according to claim 3, further comprising receiving an instruction from a user by way of an operation unit, for controlling an operation of a printing apparatus.

\* \* \* \* \*